June 23, 1970  W. W. WALLING  3,516,385
APPARATUS FOR COATING THE INTERIOR OF TUBULAR MEMBERS
Filed July 14, 1967  3 Sheets-Sheet 3
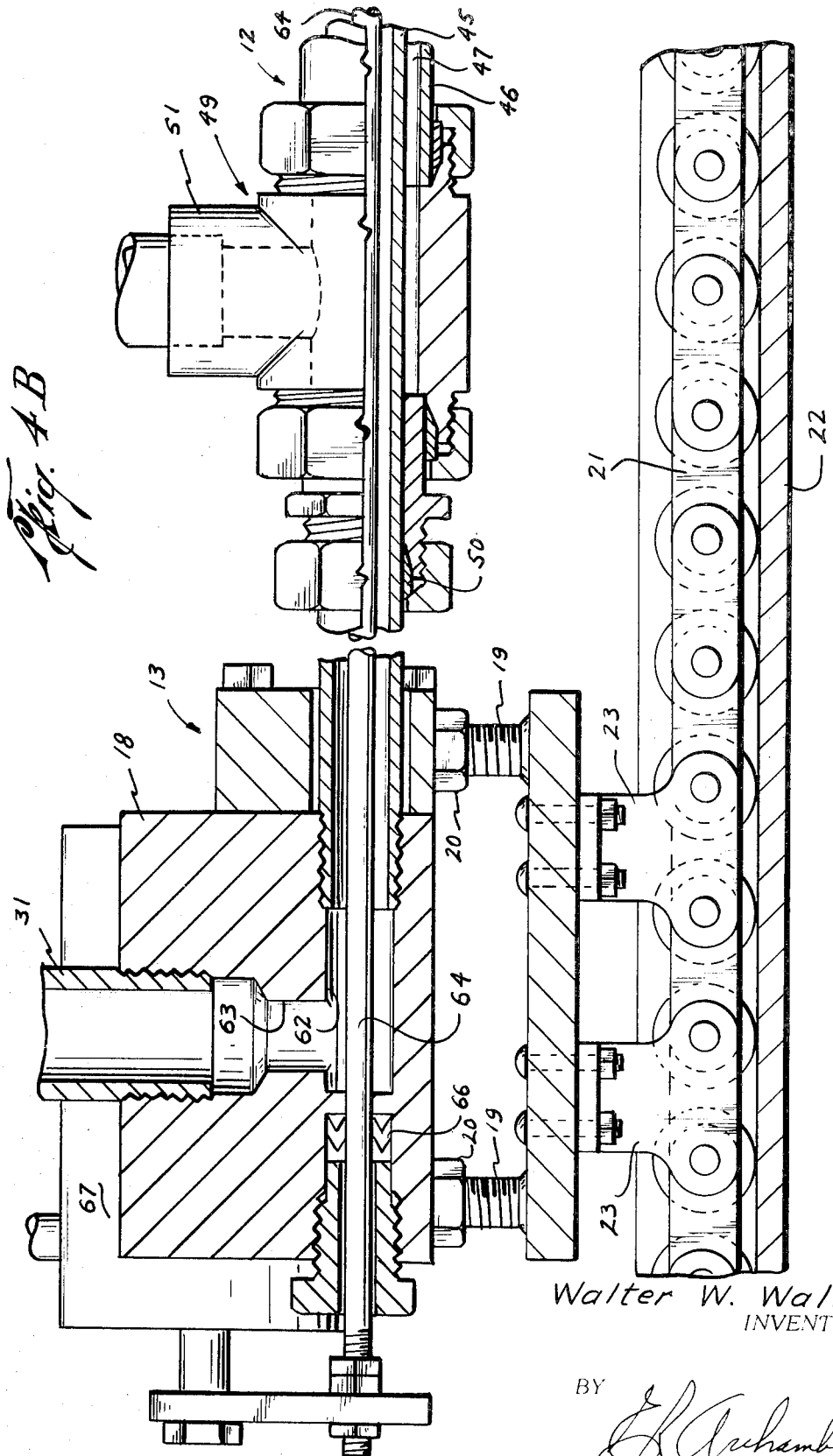
Walter W. Walling
INVENTOR.
BY 
ATTORNEY United States Patent Office 3,516,385
Patented June 23, 1970

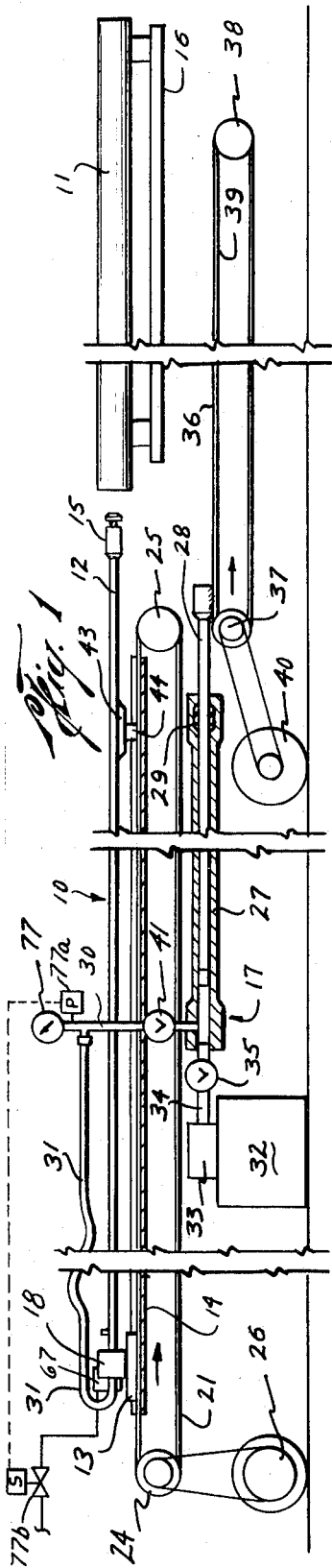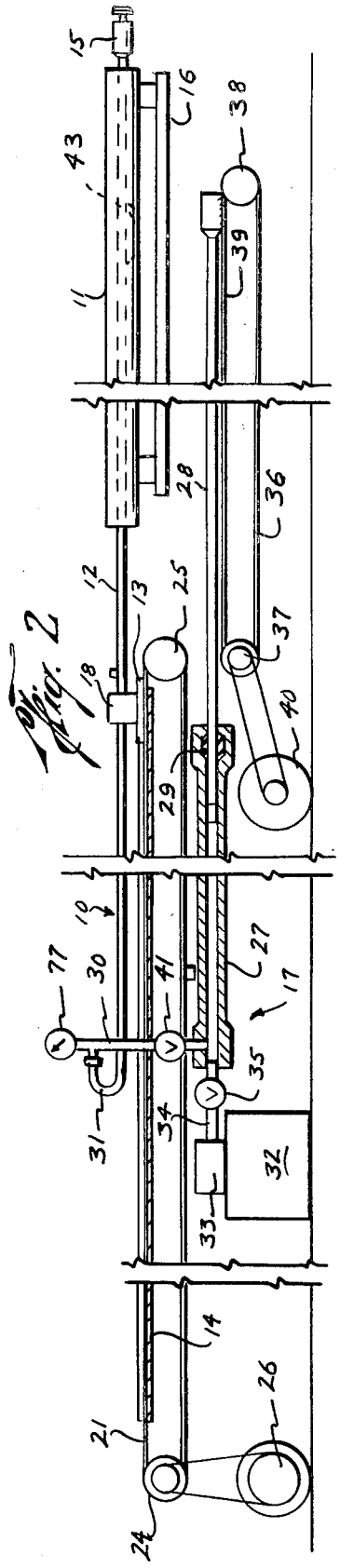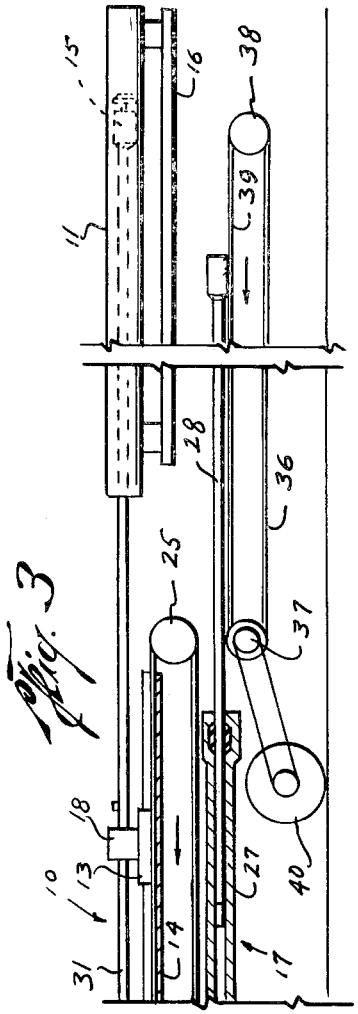
Walter W. Walling
INVENTOR.
BY
ATTORNEY

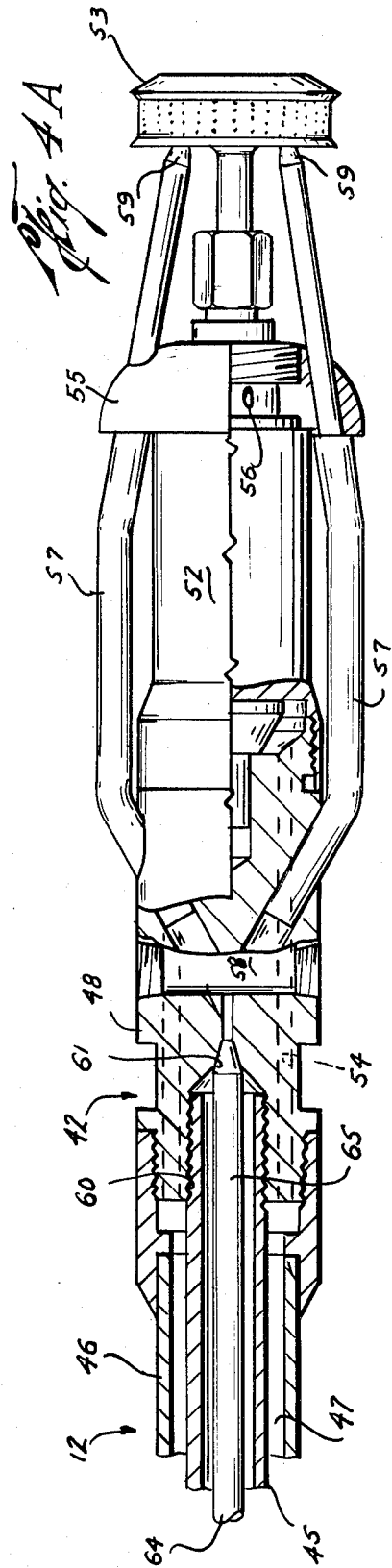
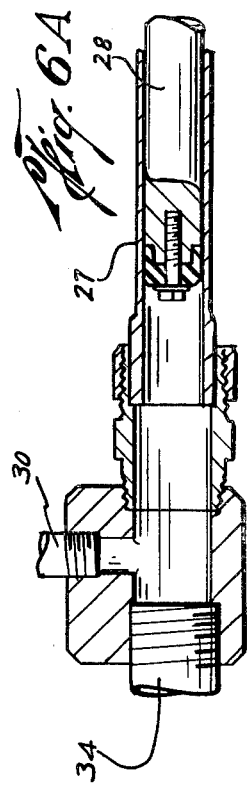
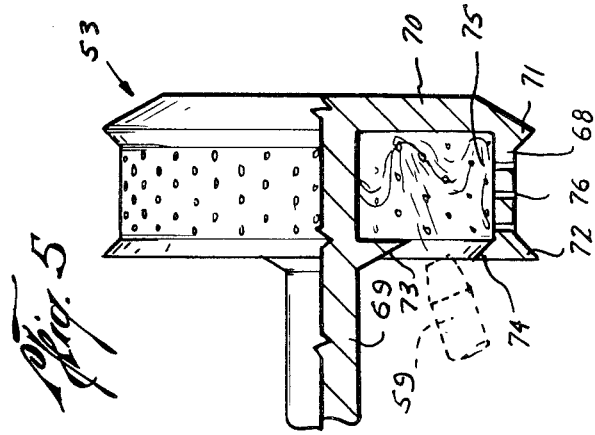

3,516,385
APPARATUS FOR COATING THE INTERIOR OF TUBULAR MEMBERS
Walter W. Walling, Houston, Tex., assignor to Schlumberger Technology Corporation, Houston, Tex., a corporation of Texas
Continuation-in-part of application Ser. No. 404,645, Oct. 19, 1964. This application July 14, 1967, Ser. No. 653,546
Int. Cl. B05c 5/00
U.S. Cl. 118—7                        6 Claims

ABSTRACT OF THE DISCLOSURE

A centrifugal coating applicator mounted on the distal end of an elongated probe is arranged for traversal at a constant speed within a tubular member to be coated. To supply coating materials to the applicator at a constant volume, a piston is arranged to be advanced at a constant rate of travel into a cylinder containing the coating materials and connected to the applicator. By sizing the piston to displace at least a volume of coating material sufficient to completely coat a tubular member in a single stroke of the piston, a constant, unvarying rate of delivery will be obtained.

---

This application is a continuation-in-part of Ser. No. 404,645, filed Oct. 19, 1964, now abandoned.

The need for internal protective coatings for tubular members to prevent corrosion and the like is, of course, widely recognized. Such protective coatings are customarily applied to the internal surfaces of tubular members by spraying or otherwise depositing appropriate coating materials. Heretofore, however, typical coating devices have required a number of passes of the coating apparatus through the tubular member to obtain a composite coating of uniform thickness along the length of the member. Moreover, it is usually necessary to roll the member slightly to a different angular position following each pass to hopefully obtain a composite coating of uniform thickness about the internal circumference of the member. It will be appreciated, of course, that successive passes of a coating apparatus through a tubular member can quite easily damage previously-applied coats and, if the integrity of the composite coating is to be maintained, the subsequent coats must fill in any such defects. This can be somewhat alleviated by resorting to skids, wheels, or the like, which reduce contact of the coating apparatus with the previously-applied coatings, but such devices are not completely reliable.

It has been found that the principal reason for such irregularities in coating thickness is the inability of the coating apparatus to maintain a consistently uniform distribution of coating material as the applicator is moved along a pipe. For example, if a uniform distribution pattern is not produced from the applicator, the internal circumferential surfaces at any given point in the tubular member will not be coated to the same thickness. Similarly, if the coating material is not delivered to the applicator at a consistent rate of delivery or the applicator is not moved at a uniform speed in relation to the tubular member, the thickness of the resulting coat will vary correspondingly along the length of the tubular member.

One of the most significant sources of irregular delivery from an applicator has been found to be transient changes in delivery conditions of the coating materials such as may be caused by non-uniform delivery pressures and variations in pressure drops and temperatures of the coating materials as they flow through the delivery system. These transistory changes are further accentuated by unpredictable changes in the rheological properties of the coating material during the coating operation since many coating materials are non-Newtonian in nature and their properties do not change in a uniform manner.

There are, of course, wide variations in the rheological properties of the many different coating materials that may be applied with any given coating apparatus. Moreover, there are many variations in the sizes of tubular members that must be coated from time to time. Thus, it has not been possible heretofore to provide satisfactory coating apparatus that will apply uniform coatings of various materials in a single application as well as accommodate different sizes of tubular members.

Accordingly, it is an object of this invention to provide new and improved apparatus for applying protective coatings of uniform thickness both circumferentially and longitudinally in a single pass through a tubular member, with such apparatus being readily adaptable for different sizes of tubular members and different coating materials.

This and other objects of the present invention are obtained by providing coating apparatus including an elongated member having a coating applicator on its distal end that is adapted for longitudinal travel at a constant rate relative to the internal bore of a tubular member to be coated. An elongated cylinder having a displacement piston slidably sealed therein is appropriately arranged to deliver coating materials initially collected in the elongated cylinder to the coating applicator at a constant flow rate as the applicator is moved in relation to a tubular member being coated. In this manner, irrespective of variations in delivery conditions or coating compositions, a predetermined volume of coating material will be delivered at a constant rate to the applicator to provide a uniform thickness of coating along the tubular member as the applicator and tubular member are moved longitudinally in relation to one another.

To still further insure each uniform application, a preferred embodiment of the coating applicator is comprised of a distributor member that is appropriately journalled on the distal end of the elongated member for rotation about an axis coincidental with the axis of a tubular member being coated. The distributor member includes an annular rim mounted on an axial shaft by a continuous lateral member providing a closed forward end and having an inwardly projecting lip on its rearward end to define a reservoir around the internal circumferential surface of the rim. As the distributor is rotated at high speed, coating material injected into the reservoir will be centrifugally distributed outwardly therefrom by way of a plurality of apertures uniformly spaced circumferentially around the rim. Outwardly directed lips on the shaft as well as forward and rearward peripheral edges of the rim are preferably provided to prevent excess coating material from accumulating and being subsequently expelled at irregular intervals.

The novel features of the present invention are set forth with particularity in the appended claims. The operation, together with further objects and advantages thereof, may best be understood by way of illustration and example of certain embodiments when taken in conjunction with the accompanying drawings, in which:

FIGS. 1–3 are somewhat schematic views of a preferred embodiment of the present invention representing successive positions of the various elements thereof during the course of a typical coating operation;

FIGS. 4A and 4B are cross-sectional views showing various details of a preferred embodiment of the coating apparatus depicted in FIGS. 1–3;

FIG. 5 is an elevational view, partially in cross-section, of a centrifugal coating distributor arranged in accordance with the principles of the present invention; and FIGS. 6A and 6B are cross-sectional views showing certain features of other portions of the apparatus of the present invention.

Turning now to FIGS. 1–3, somewhat simplified but schematic views are shown of a coating apparatus 10 arranged in accordance with the principles of the present invention as it is successively operated to coat the interior surfaces of an elongated tubular member such as a joint of pipe 11. In FIG. 1, the coating apparatus 10 is shown as it appears before starting to coat the pipe 11. FIG. 2 depicts the coating apparatus 10 as it is readied for a coating operation, with FIG. 3 showing the apparatus as it begins to coat the interior of the pipe 11.

In general, the coating apparatus 10 is comprised of an elongated support or lance 12 of a greater length than the pipe 11, with the lance being disposed in a generally horizontal plane and supported at one end by a movable carriage 13 adapted for longitudinal travel back and forth on a suitable stand or support 14 for a distance somewhat greater than the length of the pipe 11. A coating applicator 15 is operatively arranged on the distal end of the lance 12 to uniformly distribute a supply of coating material delivered thereto in a generally radial pattern as the lance is moved longitudinally through the internal bore of the pipe 11 that is positioned on a suitable rack 16 in substantially coincidental alignment with the central axis of the lance. Constant-volume supply means 17 are provided to deliver an unvarying flow of coating material to the applicator 15 as it is traversed through the pipe 11.

It is, of course, desirable that the lance 12 remain in substantial alignment with the longitudinal axis of the pipe 11 as they are moved in relation to one another. Accordingly, as schematically depicted in FIGS. 1–3, the supported end of the lance 12 is suitably secured to a support member 18, with this support member being mounted on the carriage 13 for movement thereby. As best seen in FIG. 4B, the support member 18 is preferably secured to the carriage 13 by a plurality of upright bolts 19 with each of the bolts having adjustable nuts, as at 20, that can be positioned as necessary to raise or lower the support member so as to bring the lance 12 into vertical alignment with the pipe 11 to be coated. The pipe rack 16 is, of course, suitably positioned to horizontally align the longitudinal axis of the pipe 11 with that of the lance 12.

It is preferred to move the lance 12 back and forth in relation to the pipe 11 which is best maintained stationary. Accordingly, in one manner of accomplishing this, longitudinally movable driving means are provided such as a pair of roller chains 21 or the like (only one seen in the drawings) that are spaced apart and separately confined in upturned, longitudinal channels or guides 22 (only one seen in the drawings) that are laid horizontally along opposite sides of the support 14. As best seen in FIG. 4B, the opposite sides of the carriage 13 are secured to the chains 21, as by upright connecting members 23, so that as the chains are moved in relation to the support 14, the lance 12 is selectively advanced into or withdrawn from the pipe 11 to be coated.

To drive the carriage 13 back and forth along the support 14, the roller chains 21 are preferably made continuous and operatively arranged on appropriate driving and idler sprockets 24 and 25 (only one of each shown in the drawings) journalled at each end of the support. Suitable motive means, such as a reversible electric motor 26, are operatively connected to the driving sprockets 24 and arranged to move the carriage 13 along the support 14. It will be appreciated, of course, that the support 14 and chains 21 are of sufficient length to be capable of traversing the applicator 15 a distance at least slightly more than the length of the pipe 11.

It has been found that even the best of pumps are incapable of providing a steady flow of coating material. Accordingly, to insure that coating material will be delivered to the coating applicator 15 at a constant flow rate, the constant-volume supply means 17 of the present invention are comprised of an elongated piston cylinder 27 in which a slidable piston 28 is fluidly sealed, as at 29, in one end of the cylinder and arranged for displacing coating material from the other closed end of the cylinder to the coating applicator 15 by way of suitable interconnecting conduits 30 and a flexible tube or hose 31 adapted for movement over the span of travel of the lance 12.

Of particular significance to the present invention it should be noted that the cylinder 27 is selected to have a length and an internal diameter such that only somewhat less than a single stroke of the piston 28 from its extended to its telescoped position will be required to displace a volume of coating material therefrom that is sufficient to completely coat the internal surfaces of the pipe 11 upon a single pass of the applicator 15. Thus, as will be readily appreciated, a steady, uninterrupted movement of the piston 28 from its extended position (FIG. 2) toward its telescoped position (FIG. 3) will displace coating material from the other end of the cylinder 27 at a constant flow rate that is unaffected by changes in either the flow conditions downstream of the displacement cylinder or the properties of the coating material.

In one manner of supplying coating materials to the cylinder 27, a tank 32 of suitable size is connected to a pump 33 that is adequately sized to deliver the coating material by way of a conduit 34 and valve 35 to the closed end of the cylinder. Thus, to refill the cylinder 27, it is necessary only to open the valve 35 and start the pump 32 to deliver coating material to the cylinder as the piston 28 is moved toward its extended position (FIG. 1).

Although other relative proportions may be selected, it is preferred to make the piston 28 of a relatively small diameter and a substantial length. In this manner, to displace a given volume of coating material from the cylinder 27, the piston 28 must be moved a considerable distance thereby making it easier to precisely relate the length of the stroke to a delivered volume of coating material to be applied in the coating operation. With such a relatively slender piston member 28, it will, of course, be necessary to support it as it is being moved from its extended position (FIG. 2) toward its fully telescoped position (FIG. 3).

Thus, in one manner of driving the piston 28 while still fully supporting it, linearly-moving driving means such as one or more continuous roller chains 36 (similar to those shown at 21) are operatively arranged on driver and idler sprockets 37 and 38 journalled at opposite ends of a suitable support 39 that is longitudinally aligned with the piston and extended beyond the piston-end of the cylinder 27. As best seen in FIG. 6B, the outer end of the piston 28 is connected to the roller chains 36 for movement thereby. Suitable motive means, such as a reversible constant-speed electric motor 40, are operatively connected to the sprockets 37 to drive the chains 36 back and forth in relation to the support 39 and move the piston 28 between its several positions as shown in FIGS. 1–3.

Accordingly, with the coating apparatus 10 being initially in the position depicted in FIG. 1 and the pipe 11 on the rack 16 in readiness to receive a coating, the lance 12 is passed through the pipe and halted once the applicator 15 is positioned a short distance beyond the distant end of the pipe as seen in FIG. 2. This movement is, of course, accomplished by running the motor 26 in the appropriate rotational direction until the applicator 15 is beyond the distant end of the pipe 11.

The displacement cylinder 27 must also be filled with a sufficient quantity of coating material to insure complete coverage of the internal surfaces of the pipe 11 in a single traversal of the applicator 15 therethrough. To accomplish this, the valve 35 is opened and the pump 33 operated as the piston 28 is moved from its fully-telescoped position shown in FIG. 1 to its fully-extended position shown in FIG. 2. A valve 41 in the conduit 30 is closed to allow the cylinder 27 to fill. By filling the cylinder 27 as the piston 28 is withdrawn therefrom, the cylinder will be filled in such a manner that little or no air will be trapped in the cylinder. Thus, once the piston 28 has reached its fully-extended position, the cylinder 27 will be completely filled and the pump 33 halted. The valve 35 is then closed and the apparatus 10 is in readiness to begin a coating operation.

It will be appreciated, of course, that to insure a uniform application of the coating material on the internal surfaces of the pipe 11, the applicator 15 must be operating in its intended manner before it is traversed back through the pipe. Thus, where the applicator 15 includes a centrifugal-type of distributor, it must be turning at full operating speed before the coating application is started. Similarly, if a typical spraying device is used, it too must, of course, be in readiness to deliver the coating material. Moreover, in either instance, the coating material must also be flowing at the desired rate to the applicator 15 before the applicator is returned back through the pipe.

To insure that the coating material is flowing at the desired rate before the applicator 15 is traversed through the pipe 11, the motor 40 is appropriately switched to start it in the reverse direction to begin moving the piston 28 back into the displacement cylinder 27. It will be appreciated that once the motor 40 has reached its full operating speed, the piston 27 will be retracted at a steady rate to insure that the coating material is delivered to the applicator 15 at a constant rate irrespective of changes or variations in the delivery conditions.

As the piston 28 first begins moving into the cylinder 27, the valve 41 is opened to allow the coating material to begin flowing into the conduits 30 and 31 leading to the applicator 15 which, at this time, is still stationed beyond the distant end of the pipe 11. By providing normally-closed valve means 42 in the conduit 31 near the applicator 15 (as will subsequently be explained with respect to FIG. 4A), it will be appreciated that once the coating material has completely filled the conduits 30 and 31 ahead of this closed valve 42, the coating material will reach whatever pressure is then being developed by the movement of the piston 28 into the cylinder 27. In this manner, since the hose 31 will be fully distended and flexed before the applicator 15 is moved back through the pipe 11, the internal dimensions of the hose will remain substantially constant during the course of the coating operation.

Once the pressure has reached a magnitude that is sufficient to maintain an adequate supply of coating material to the applicator 15, the valve means 42 are opened to admit coating material under pressure to the applicator which is still in the position shown in FIG. 2. In this manner, it may be reliably determined that coating material is being uniformly distributed by the applicator 15 before commencing the actual coating operation. It will be recognized, however, that although the delivered pressure may fluctuate as the valve means 42 are opened and even thereafter, the steady movement of the piston 28 as it is being stroked into the cylinder 27 will maintain a constant flow rate of coating material to the applicator 15 until the coating operation is completed.

Accordingly, once it is determined that the applicator 15 is satisfactorily delivering the coating material, the motor 26 is operated in the appropriate direction to return the lance 12 back through the pipe 11. By starting the actual coating operation with the applicator 15 initially just beyond the distant end of the pipe 11 it will be appreciated that the motor 26 will have sufficient time to reach full speed and begin driving the roller chains 21 at a constant speed by the time the applicator enters the pipe. Thus, as the lance 12 is retracted, the applicator 15 will traverse the full length of the pipe 11 at a uniform rate of linear travel with the constant-volume supply means 17 insuring that the applicator is distributing the coating material at a constant rate of delivery to insure that a uniform thickness of coating material is being applied consistently along the internal surfaces of the pipe. Once the applicator 15 re-emerges from the pipe 11, the motors 26 and 40 are halted to end the coating operation.

It will be appreciated that a more uniform coating will be applied by maintaining the applicator 15 in substantial concentric relation with the pipe 11. Accordingly, one or more supports or guides 43 are appropriately arranged at spaced intervals along the lance 12 to centralize the applicator 15 and at least the forward portion of the lance within the pipe 11. Moreover, by connecting a plurality of transverse members 44 between the roller chains 21 at appropriate intervals, the chains will successively bring these transverse members directly under the guides 43 as they emerge from the pipe 11 to support the outer portion of the lance 12 as it is removed from the pipe.

Turning now to FIGS. 4A and 4B, preferred embodiments are shown of the lance 12, valve means 42, and coating applicator 15, all of which are arranged in accordance with the present invention. It will be appreciated, of course, that although the hose 31 could be extended along the lance 12 to the applicator 15, it is more efficient to terminate the hose at the lance support member 18 and utilize the lance itself as a conduit. Similarly, where a source of pressured fluid must be conducted to the applicator 15 as, for example, for either an air-spray nozzle or an air-driven centrifugal distributor, it is prefered to arrange the lance 12 as two concentric pipes that are fluidly sealed from one another, with the longer inner pipe 45 preferably being used to conduct the coating material and the shorter outer pipe 46 carrying the pressured fluid. If, on the other hand, the applicator 15 is electrically powered, the annular space 47 between the pipes 45 and 46 could be used to carry the necessary conductors to the applicator.

Accordingly, the inner pipe 45 is fluidly connected to the support member 18 on the carriage 13 and extended through the outer pipe 46 to a fluid connection at the rear of a manifold 48 carried on the forward ends of both pipes. Where a pressure fluid is being supplied to the applicator 15, the outer pipe 46 is also fluidly connected to the rear of the manifold 48 and extended back over the inner pipe 45 to a suitable branched fitting 49 that is fluidly sealed, as at 50, around the inner pipe and provided with a lateral branch 51 arranged to receive a supply of pressured fluid for passage through the annular space 47 between the pipes.

The applicator 15 of the present invention is axially aligned with the lance 12 and mounted on the forward end of the manifold 48. As best seen in FIG. 4A, the applicator 15 is comprised of a suitable driver, such as an appropriate electrical or fluid-powered motor 52, having a centrifugal coating distributor 53 mounted on the forward end of the axially-extending shaft of the fluid motor. To supply the motor 52, which is preferably air-driven, a plurality of longitudinal passages 54 are appropriately arranged in the manifold 48 to conduct compressed air from the branched fitting 49 through the annular space 47 to the air inlets (not shown) in the rear of the air-driven motor. A rearwardly directed deflector 55 is mounted on the forward end of the air-driven motor 52 to deflect air being exhausted from the exhaust ports 56 back down the pipe 11 away from the distributor 53.

To avoid conducting the coating material through the shaft of the air-driven motor 52, one or more delivery tubes 57 are fluidly connected to an enclosed chamber 58 formed in the manifold 48, with these tubes being extended around the air-driven motor and terminated in nozzles 59 operatively arranged in relation to the distributor 53. Fluid communication is provided between the forward end of the inner pipe 45 and the chamber 58 by means of an interconnecting longitudinal bore 60 formed in the manifold 48 and appropriately arranged to define a rearwardly-facing annular valve seat 61 therein. After emerging from the branched fitting 49, the rearward end of the inner pipe 45 is fluidly connected to a longitudinal bore 62 extending through the lance support member 18 and intersected therein by a lateral bore 63 to which the hose 31 is fluidly connected.

The valve means 42 are comprised of an actuator, such as an elongated rod 64, connected to a valve member 65 that is complementally shaped for seating engagement with the valve seat 61 and preferably an integral part of the forward end of the rod. The elongated rod 64 is loosely disposed for reciprocating movement in the inner pipe 45 and its rearward portion extended through suitable packing means 66 in the longitudinal bore 62 to the exterior of the supporting member 18. Although the elongated rod 64 could just as well be manually positioned, it is preferred to connect the exposed rearward end of the rod to a selectively-operable reciprocating actuator 67 that is preferably actuated by a pressured fluid.

Accordingly, it will be appreciated that the flow of coating material through the lance 12 to the applicator 15 will be controlled by moving the valve member 65 into and out of seating engagement with the valve seat 61. Thus, when the piston 28 is first moved toward its fully-telescoped position as previously explained with respect to FIGS. 2 and 3, the valve member 65 will be tightly seated on the seat 61. Then, once the actuator 67 is operated to shift the valve member 65 off of its seat 61, coating material will flow into the chamber 58 and be conducted to the distributor 53 by the tubes 57 and nozzles 59. It will be recognized, of course, that although it might be simpler to locate the valve seat 61 further upstream, it is preferred to arrange the valve means 42 as shown to reduce, if not eliminate altogether, the passage of residual coating materials through the nozzles 59 as the lance 12 is first moved through the pipe 11 to its position shown in FIG. 2.

Turning now to FIG. 5, a preferred embodiment is shown of the coating distributor 53 arranged in accordance with the present invention. As seen there, the distributor 53 includes an annular rim 68 concentrically supported for rotation about a longitudinal shaft 69 by a lateral planar member 70 totally enclosing the forward end of the annular space between the shaft and rim. Outwardly-converging, tapered peripheral flanges 71 and 72 are formed around the forward and rearward edges of the rim 68. Similarly, an outwardly-converging tapered lip 73 is formed around the shaft 69 to the rear of the planar member 70 and within the confines of the rim 68. An inwardly-directed tapered flange 74 is also formed around the rearward edge of the rim 68 so that, upon high-speed rotation of the distributor 53, a circumferentially extending reservoir 75 will be defined around the internal surface of the rim to receive coating material emitted from the nozzles 59.

Accordingly, the nozzles 59 are appropriately directed to discharge the coating material against the rearward face of the planar surface 70 as the distributor 53 is rotated. The rotational speed of the distributor 53 will cause the coating material to flow radially outwardly under the influence of centrifugal force and be collected in the reservoir space 75. To distribute coating material in a uniform pattern, a plurality of holes 76 are provided through the rim 68 at regularly spaced intervals around the full circumference of the rim. Thus, as the distributor 53 is rotated, the reservoir 75 will insure that the coating material is at a uniform depth around the rim 68 to provide equal flow through all holes 76 at the same time.

It should also be noted that should coating material collect on the shaft 69 between coating operations, upon starting of the applicator 15, the rotation of the distributor 53 will cause any collected material to move up the tapered lip 73 and be centrifuged back into the reservoir 75. Similarly, the tapered outer edges 71 and 72 will insure that any residual coating material that may have accumulated around the exterior of the rim 68 will be thrown off in a fine stream rather than in irregularly-sized droplets. Thus, when the applicator 15 is withdrawn from the pipe 11 at the end of a coating operation and the supply of coating material stopped, any residual coating material collected on the outside of the rim 68 will be centrifuged onto the outer edges 71 and 72 and thrown off. This will, of course, preclude the possibility of droplets falling off of the rim 68 as the applicator 15 is being inserted into the next pipe 11 to be coated.

The high rotational speeds at which the applicator 15 is operated will, of course, require that the distributor 53 be dynamically balanced. Moreover, it should also be recognized that the streamlined design of the distributor 53 will reduce to a minimum any air turbulence as the distributor is rotated so that the resulting distribution pattern of the coating material will be as uniform as possible.

It will, of course, be appreciated that the design of the distributor 53 will permit to be used with coating materials having widely varying viscosities to coat pipes of a wide range of sizes. For any given distributor 53, the rotational speed of the distributor must be increased to apply the more viscous coating materials. For instance, with a distributor 53 having an outside rim diameter of 1⅛ inches, rotational speeds of about 5,000 r.p.m. will be sufficient for such materials as thin primers or low-solids, low-molecular weight phenolic solutions. On the other hand, with the same distributor 53, vinyl organosol materials typically require rotational speeds in the order of 15,000 to 20,000 r.p.m. and vinyl plastisol materials typically require rotational speeds of at least 30,000 r.p.m.

The number and size of the apertures 76 will, of course, be a factor in the design of the distributor 53. For instance, with the above-described distributor 53, the holes 76 were in the order of 0.020 inch in diameter. To insure uniform distribution, the holes 76 must, of course, be spaced equally about the circumference of the rim 68, with the number of longitudinally spaced rows of such holes determining the rate at which the applicator 15 can be traversed through the pipe 11 to apply a given coating thickness.

In addition to these factors, the number and size of the holes 76 will further depend upon the thickness of the rim 68 and the anticipated depth of the coating material to be maintained in the reservoir 75 as the distributor 53 is being used. These various parameters can, however, be simply determined by one skilled in the art without undue experimentation.

Although the operation of the coating apparatus 10 as previously described with respect to FIGS. 1–3 can be completely manual, it is readily apparent that provisions can be made to control the apparatus either semi-automatically or fully-automatically. For example, suitable limit switches (not shown) can be provided to limit the span of travel of both the carriage 13 and the piston member 28 in relation to their respective supports 14 and 39. Moreover, various control systems can be readily provided to establish a prescribed sequence of operation of the valves 35 and 41, the pump 33 and motors 26 and 40. Means should also be provided for insuring sufficient time-delays in such a programmed sequence to enable the air-motor 52 and the motors 26 and 40 to respectively reach their rated speeds before the next step in the sequence is initiated.

The valve means 42 can, of course, be controlled manually by observing a pressure gage 77 in the coating material conduit 30 (FIGS. 1–3) and retracting the elongated rod 64 (FIGS. 4A and 4B) whenever the pressure being developed by the constant-volume supply means 17 reaches a desired magnitude. It is however, preferred to provide a typical pressure switch 77a for opening a solenoid valve 77b for selectively admitting a supply of compressed air to the actuator 67 that will operate the pressure-controlled actuator 67 (FIG. 4B) whenever the desired coating material pressure is attained.

The selection of the motive means, such as the motors 26 and 40, is, of course, of particular significance to the success of the present invention. Although the only essential co-operation required between the motors 26 and 40 is to be certain that the piston 28 is moving toward its fully-telescoped position as the applicator 15 is traversing the pipe 11 and distributing the coating material, both motors must remain at a substantially constant speed during this portion of the coating operation. To achieve such constant-speed operation, therefore, the motors 26 and 40 can either be oversized so that variations in load will not significantly affect their respective speeds or appropriate electrical or electronic speed-regulating devices (not shown) can be employed to accomplish the same result. In any event, by closely regulating the speed of the motors 26 and 40 or whatever motive means are employed, the lance 12 will be withdrawn from the pipe 11 at a constant rate of travel as the coating material is delivered to the applicator 15 at a constant flow rate by the steadily moving piston 28.

It should also be noted that although the sequence of operation described with reference to FIGS. 1–3 is preferred to avoid moving the lance guides 43 over freshly-deposited coating material, the lance 12 can in some instances be inserted into the pipe 11 as the coating material is being applied. This will, of course, cause the lance guides 43 to move through the freshly-applied coating material. Those skilled in the art will appreciate, however, that some coating materials are sufficiently fluent that after the lance 12 is withdrawn, such coating materials will flow back into any irregularities left by the lance guides 43 and leave a relatively uniform coating whenever the coating material is finally set.

The length of stroke of the piston member 28 for a given diameter thereof will, of course, determine the volume of coating material delivered during a coating operation. Similarly, the rate of longitudinal travel of the lance 12 will regulate the thickness of the coating material applied to the pipe 11. Thus, in some instances, it will be possible to obtain more than one traversal of the lance 12 for a single stroke of the piston 28, with the piston, of course, being successively moved only a short distance through the cylinder 27 for each coating operation. In any event, it is essential only that the piston 28 be moved at a steady, unvarying rate in the same direction throughout each particular coating operation.

Referring again to FIGS. 6A and 6B, it will be appreciated that for a particularly slender piston 28, its outer end portion must be suitably supported as the piston is being moved into the cylinder 27. To accomplish this, the outermost end of the piston 28 is arranged to be received in an axially aligned tubular guide 78 extended beyond the piston-end of the cylinder 27. A connecting link 79 dependently secured from the outermost end of the piston 28 and attached to the roller chains 36 is arranged to move freely through a longitudinal slot 80 provided along the full length of the bottom of the tubular guide 78. Thus, as the piston 28 is moved into the cylinder 27, the tubular guide 78 will confine the piston and prevent it from buckling under the axial load.

It should also be noted that as the piston 28 is moved into and out of the cylinder 27 during successive coating and re-filling operations, residual coating materials can quite easily begin to accummulate on the piston. Thus, in time, such residual accumulations will harden and damage the sealing means 29. To prevent this, as seen in FIG. 6B, the sealing means 29 is arranged as a packing gland having spaced sealing members 81 and 82 defining therebetween an annular space 83 between the cylinder 27 and piston 28. Accordingly, it has been found that by maintaining a supply of suitable solvent in the gland space 83 as by connecting either a cup-type reservoir (not shown) or a suitable pressure source (not shown) to a port 84 leading into the space. In this manner, each time the piston 28 is withdrawn from the cylinder 27, the piston will be cleaned as it progressively passes through the gland space 83.

Accordingly, it will be realized that the present invention has provided means which, for the first time, will insure that a coating material will be applied in a uniform thickness over a surface without variation in either a longitudinal direction or transverse direction. By arranging a cylinder for containing coating material to be delivered to the coating applicator and moving a piston in one direction at an unvarying speed through a cylinder, a predetermined volume of coating material will be delivered to the applicator at a constant rate of delivery. Moreover, by employing a centrifugal distributor as the coating applicator receiving the steady flow of coating material, uniform distribution will be insured about the internal surfaces of a pipe or other tubular member being coated.

While particular embodiments of the present invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. Apparatus for uniformly applying fluent coating materials to the internal surfaces of a tubular member in a single traversal therethrough and comprising: an elongated probe adapted for reception in a tubular member to be coated and having a length at least equal to its length; applicator means on one end of said probe and adapted for reception in such a tubular member to distribute coating materials on the internal surfaces thereof; first motive means supporting the other end of said probe and selectively operable for independently moving said applicator means and probe at a constant speed through such a tubular member; constant-volume supply means adapted for supplying fluent coating materials to said applicator means and including a cylinder, a piston member sealingly disposed in one end of said cylinder and movable therein from an extended position to a telescoped position and adapted to displace from the other end of said cylinder in a single stroke a volume of coating materials at least sufficient to provide a single coat on the internal surfaces of such a tubular member, conduit means adapted for conducting coating materials from said other cylinder end along said probe to said applicator means, and second motive means selectively operable independently of said first motive means for advancing said piston into said cylinder at a constant rate of travel independently of movement of said applicator means at a constant speed from one end of a tubular member being coated to the other end thereof; means for fluidly sealing said piston member where it enters said one cylinder end and including first and second longitudinally-spaced sealing members on said cylinder and defining therebetween an enclosed annular space around said piston member; and means adapted to supply a solvent to said annular space for cleaning residual coating materials from those portions of said piston member passing through said annular space.

2. Apparatus for uniformly applying fluent coating materials to the internal surfaces of a tubular member in a single traversal therethrough and comprising: an elongated probe adapted for reception in a tubular member to be coated and having a length at least equal to its length; applicator means on one end of said probe and adapted for reception in such a tubular member to distribute coating materials on the internal surfaces thereof; first motive means supporting the other end of said probe and selectively operable for independently moving said applicator means and probe at a constant speed through such a tubular member; and constant-volume supply means adapted for supplying fluent coating materials to said applicator means and including a cylinder, a piston member sealingly disposed in one end of said cylinder and movable therein from an extended position to a telescoped position and adapted to displace from the other end of said cylinder in a single stroke a volume of coating materials at least sufficient to provide a single coat on the internal surfaces of such a tubular member, conduit means adapted for conducting coating materials from said other cylinder end along said probe to said applicator means, normally-closed valve means in said conduit means, second motive means selectively operable independently of said first motive means for advancing said piston into said cylinder at a constant rate of travel independently of the movement of said applicator means, and means responsive to pressure developed by said piston member upon advancement thereof into said cylinder for opening said valve means upon development of a predetermined pressure in said cylinder to supply coating materials at a steady flow rate to said probe as said applicator means are moved at a constant speed from one end of a tubular member being coated to the other end thereof.

3. The apparatus of claim 2 further including: means selectively operable for supplying coating materials at a positive pressure to said cylinder as said piston is being moved therein from its said telescoped position toward its said extended position.

4. The apparatus of claim 2 wherein said applicator means are comprised of: motor means on said one end of said elongated member; and means for distributing coating materials including a shaft operatively connected to said motor means for rotation thereby about an axis substantially coincident to the axis of a tubular member to be coated, an annular member concentrically arranged around said shaft and having an internal circumferential surface and a plurality of circumferentially-spaced lateral openings therethrough, means supporting said annular member on said shaft and defining a reservoir on said internal circumferential surface in communication with the inner terminals of said lateral openings, and means for preventing an accumulation of coating materials on the external surface of said annular member including first and second peripheral outwardly-converging projections around the external circumferential surface of said annular member and spaced on opposite sides of said lateral openings.

5. The apparatus of claim 2 further including means for preventing movement of coating materials along said shaft toward said motor means including an outwardly-converging projection encircling said shaft and having an outer peripheral edge in a plane normal to said axes and intersecting said reservoir.

6. The apparatus of claim 2 wherein said motor means are powered by a fluid and further including a deflector between said motor means and said distributor means for diverting such fluids exhausted from said motor means away from said distributor means.

References Cited

UNITED STATES PATENTS

| | | | |
|---|---|---|---|
| 1,973,440 | 9/1934 | Meyncke | 25—38 |
| 2,185,570 | 1/1940 | Ridley | 118—306 |
| 3,056,384 | 10/1962 | Beale et al. | 118—411 |
| 3,188,371 | 6/1965 | Weekley | 25—38 X |
| 3,207,383 | 9/1965 | Levake | 222—318 |
| 3,233,581 | 2/1966 | Levake | 118—317 |
| 3,279,427 | 10/1966 | Clancy et al. | 118—317 |
| 2,357,050 | 8/1944 | McCrum | 239—223 |
| 2,508,709 | 5/1950 | Groetchius | 118—317 X |
| 2,574,705 | 11/1951 | Peebles | 239—223 |
| 2,910,042 | 10/1959 | Gallmeyer et al. | 118—306 X |
| 2,986,338 | 5/1961 | Foster | 239—224 X |
| 2,992,778 | 7/1961 | Martin | 239—223 |
| 3,034,729 | 5/1962 | Gray et al. | 118—306 X |
| 3,039,890 | 6/1962 | Reindl | 239—223 X |
| 3,058,137 | 10/1962 | Doyle et al. | 118—408 X |
| 3,133,702 | 5/1964 | Stelchek | 239—224 X |
| 3,180,312 | 4/1965 | Handley et al. | 118—317 X |

FOREIGN PATENTS 846,181  8/1960  Great Britain.

JOHN P. McINTOSH, Primary Examiner

U.S. Cl. X.R.

118—317, 323; 239—186, 223